United States Patent [19]

Honett

[11] Patent Number: 4,600,073
[45] Date of Patent: Jul. 15, 1986

[54] ENGINE-DRIVEN PLATFORM FOR SPORTS, ENTERTAINMENT AND SIMILAR PURPOSES

[76] Inventor: Ronald G. K. Honett, Rue Tres Irmaos, 650 casa 5, São Paulo, Brazil

[21] Appl. No.: 656,861

[22] Filed: Oct. 2, 1984

[30] Foreign Application Priority Data

Apr. 11, 1984 [BR] Brazil .................................. 8401758

[51] Int. Cl.$^4$ .......................................... B62M 27/02
[52] U.S. Cl. ..................................... 180/181; 180/9.1; 280/11.1 ET; 280/87.04 A
[58] Field of Search ...... 280/11.1 ET, 12 H, 87.04 A; 180/180, 181, 9.1, 9.22, 9.23, 9.46

[56] References Cited

U.S. PATENT DOCUMENTS

| | | | |
|---|---|---|---|
| 2,625,229 | 1/1953 | Van Voorhees | 180/181 |
| 3,221,830 | 12/1965 | Walsh | 180/9.23 |
| 3,259,200 | 7/1966 | Maijala | 180/9.24 |
| 3,568,786 | 3/1971 | Harsch | 180/5 |
| 3,568,787 | 3/1971 | Gremeret | 180/9.24 |
| 4,035,035 | 7/1977 | Husted | 180/181 |
| 4,069,881 | 1/1978 | Shiber | 180/181 |
| 4,073,356 | 2/1978 | Schlicht | 180/181 |
| 4,094,372 | 1/1978 | Notter | 180/181 |
| 4,151,892 | 1/1979 | Francken | 180/181 |
| 4,159,121 | 6/1979 | Spitzke | 280/87.04 A |
| 4,183,546 | 1/1980 | Heilig | 280/87.04 A |
| 4,194,584 | 3/1980 | Kress | 180/9.24 |
| 4,337,961 | 7/1982 | Covert et al. | 280/11.1 ET |

FOREIGN PATENT DOCUMENTS 397668  7/1924  Fed. Rep. of Germany ..... 280/11.1 ET

OTHER PUBLICATIONS

"Sky Hooks", SkateBoarder Magazine, vol. 4, No. 4, Nov. 3, 1977.

*Primary Examiner*—David M. Mitchell
*Attorney, Agent, or Firm*—Ostrolenk, Faber, Gerb & Soffen

[57] ABSTRACT

An engine driven platform includes a bowed and rigid chassis (1) on which an endless belt (10) is secured on spaced rollers. At the center of the chassis is an engine (2) which drives the endless belt to import motion to the platform. A user stands on the upper surface of the platform.

4 Claims, 3 Drawing Figures

ENGINE-DRIVEN PLATFORM FOR SPORTS, ENTERTAINMENT AND SIMILAR PURPOSES

BACKGROUND OF THE INVENTION

This invention is related to a reduced-dimension engine-driven platform that may be used for sports and/or entertainment, in addition to being able to perform other utilitarian functions, which shall become more apparent from the following description.

In brief summary, the invention in question is characterized by the fact that it comsists of an elongated rigid device, of a substantially rectangular shape, which, however, makes up the profile of an arc along substantially its entire lengthwise direction. The platform, in its upper outside part, has a small explosion engine, and in its lower part, a flexible endless belt that can be driven, in a rotating movement, by means of the engine.

BRIEF DESCRIPTION OF THE DRAWINGS

For a better understanding of the following detailed description, drawings illustrating the engine-driven device of the present invention are attached hereto, and, in particular:

FIG. 3. is also a schematic profile that illustrates how the assembly may be utilized.

DETAILED DESCRIPTION OF THE PREFERRED EMBODIMENTS

Figure 1:
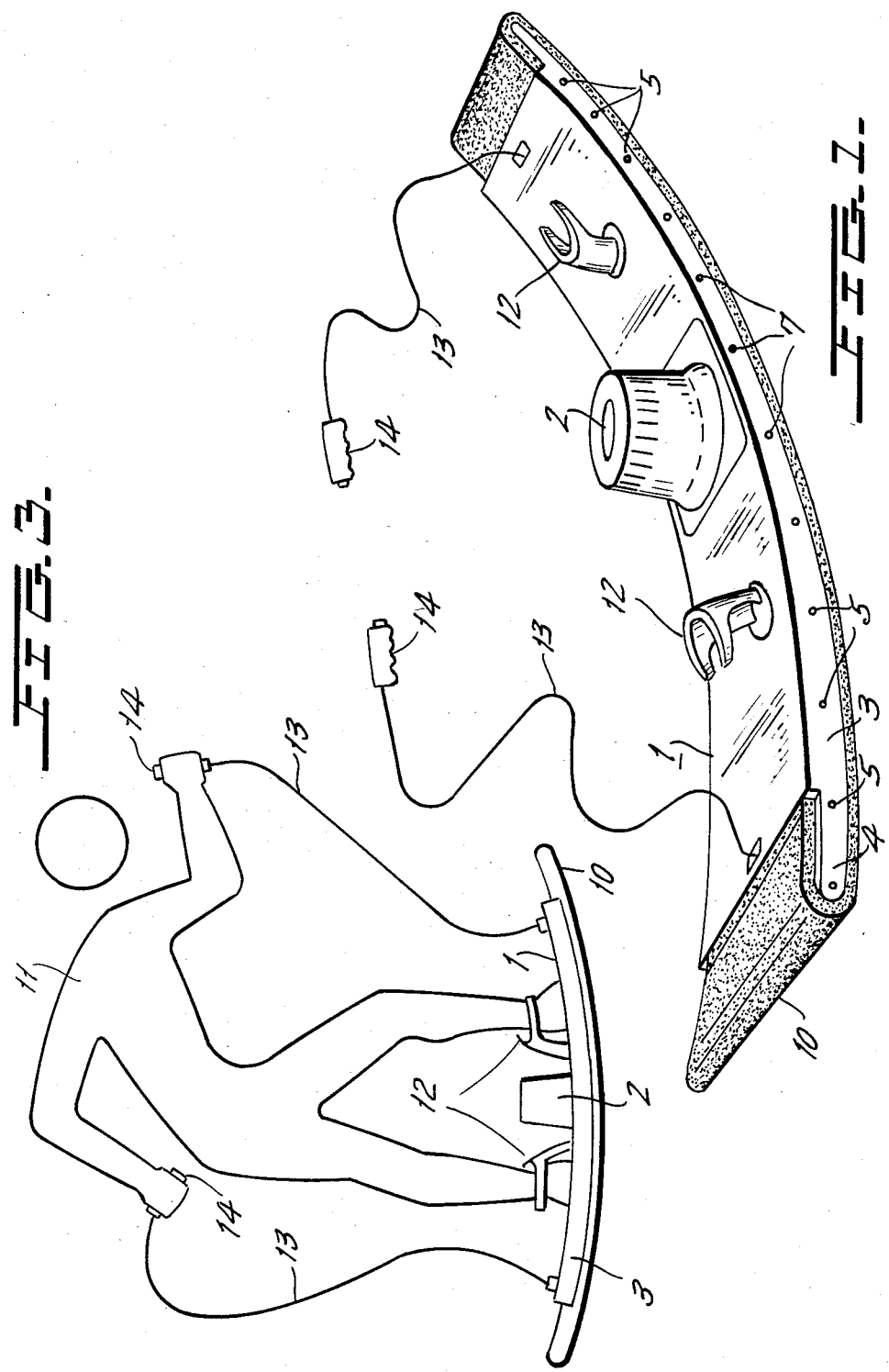
FIG. 1. represents the assembly of the present invention in a perspective view.

In accordance with FIG. 1, one may note that an engine-driven device in accordance with the present invention, consists of a chassis 1 with a preferably rectangular plan and concavous profile, made of aluminum, plastic material or any other adequate rigid material. The chassis 1 has fixed on its center a small explosion-engine 2, also incorporating an adequate fuel tank or reservoir.

Figure 2:
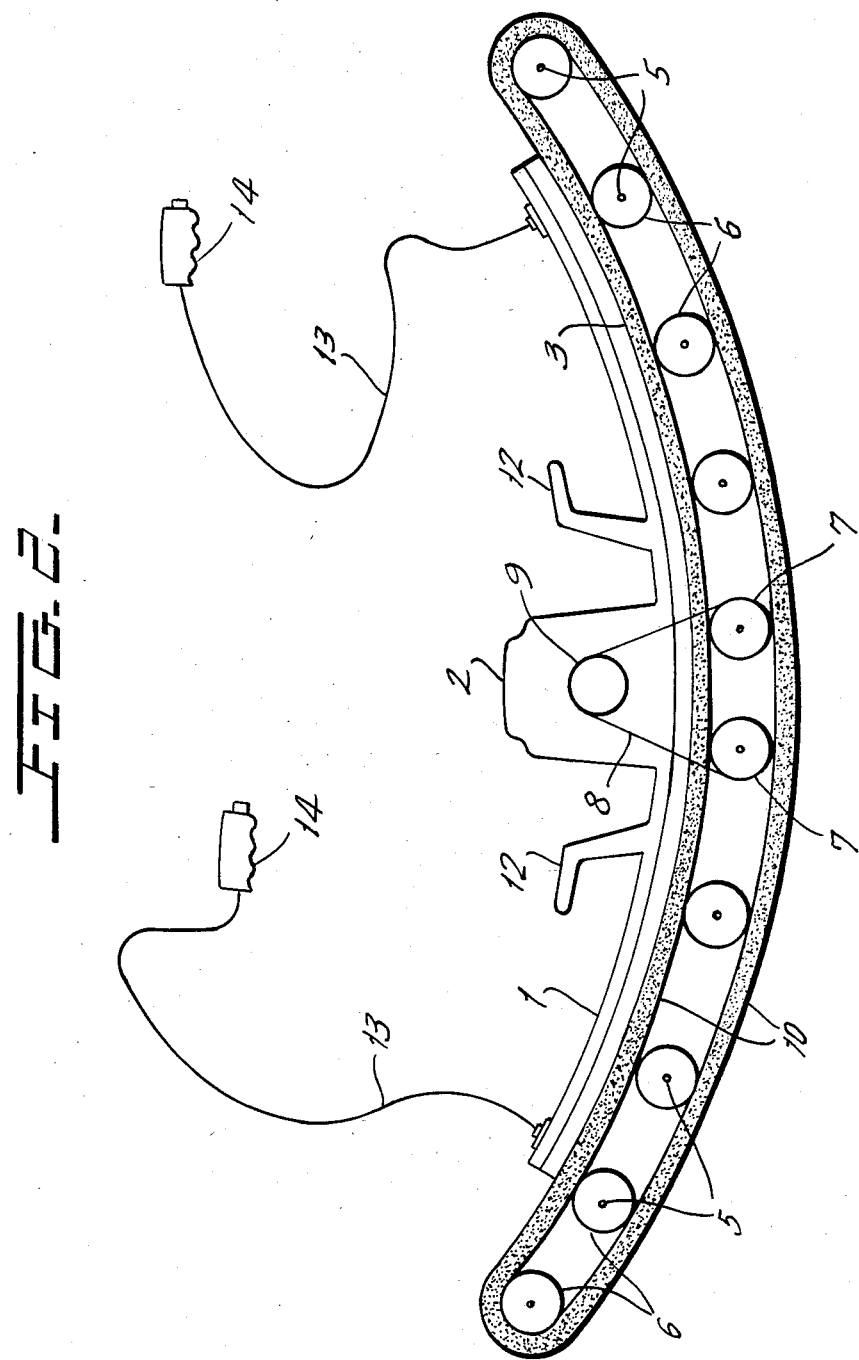
FIG. 2. illustrates the assembly in a schematic lengthwise section.

In a preferred construction, the lengthwise edges of said rigid platform are turned downwards by means of rims 3 with optional extensions 4. Referring to FIG. 2, the rims 3, through crosswise shafts or semi-shafts 5, pivot an appropriate number of rollers or bearings 6, of which the two or more central ones 7 are driven, in a rotating movement, through the belt 8 of the driving pulley 9 of the engine 2. Said rollers, in their turn, are, in their perimeter, engaged by a mat made of rubber or elastomeric material of antiskid and highly-resistant-to-abrasion type 11. The mat 10 has a continuous circulation that causes the displacement of the platform and of the user 11 (FIG. 3).

Supplementarily, the upper face of the rigid chassis 1 fastens, in an adjustable way, forks or devices 12 adequate for accomodating and supporting the user's feet or ankles 11. Extending to the outside of platform 1 at the ends, a pair of flexible cables 13 with control handles 14, are used in correspondence with the acceleration and braking of the engine 2.

The chassis 1 described above, when driven into motion by the engine-driven endless belt 10 10, can have its usually rectilinear course or travel changed directionally for side curves by mere inclinations of the user's body, similar to conventional skating practice, when it then laterally differentiates the contact and the crosswise compression of the crosswise areas of the mat against the ground.

The platform described above can, obviously, within the characterized inventive principle, take other constructional features, thus serving for diversified purposes in addition to those already mentioned, such as for parachutists in battles, deliveries of commercial articles and many others, due to the light structural assembly and its reduced dimensions.

I claim:

1. An engine driven platform for conveying a person, comprising:

a chassis on which a user may stand and having forward and rearward foot locations on which a user's feet may be respectively positioned;

an endless belt means on which the chassis is mounted for conveying the chassis along an underlying surface; and an engine mounted on the chassis and coupled to the endless belt for imparting driving power to the endless belt means;

the bottom of the endless belt means being curved for a predetermined distance from a front portion of the belt means forward of the forward foot location to a rear portion rearward of the rearward foot locations, the predetermined distance being sufficient in extent that a user may change the direction of travel of the platform by mere sideways inclination of the user's body.

2. The engine driven platform of claim 1, wherein:

the endless belt means comprises a plurality of rollers spaced from the front portion to the rear portion and a roller belt arranged to loop around at least one drive roller situated between the forward and rearward foot locations, whereby the weight of the user effectively assists the positive translation of movement from the drive roller to the roller belt.

3. The engine driven platform of claim 1, further comprising a pair of flexible control cables that are graspable by a user's hands, the control cables being coupled to the engine in such a way as to control the engine; one of the control cables being mounted forward of the forward foot location and the other control cable being mounted rearward of the rearward foot location, whereby the pair of control cables provides both forward and rearward support for the upper body of a user when grasped by a user's hands.

4. The engine driven platform of claim 1, wherein the bottom of the endless belt means is curved in substantially continuous fashion from the forward portion to the rear portion of the belt means.

* * * * *

UNITED STATES PATENT AND TRADEMARK OFFICE
CERTIFICATE OF CORRECTION

PATENT NO. : 4,600,073
DATED     : July 15, 1986
INVENTOR(S) : Ronald G. K. Honett (Hornett)

It is certified that error appears in the above-identified patent and that said Letters Patent are hereby corrected as shown below:

On the title page, Section (76), please change "Ronald G. K. Honett" to -- Ronald G. K. Hornett --.

Signed and Sealed this
Fourteenth Day of October, 1986

[SEAL]

Attest:

DONALD J. QUIGG

*Attesting Officer*   *Commissioner of Patents and Trademarks*